(12) United States Patent
Chen et al.

(10) Patent No.: US 9,303,154 B2
(45) Date of Patent: Apr. 5, 2016

(54) RUBBER COMPOSITIONS INCLUDING A POLYMERIC COMPONENT HAVING A MULTI-MODAL MOLECULAR WEIGHT DISTRIBUTION

(75) Inventors: Zhong-Ren Chen, Stow, OH (US); Kevin McCauley, Akron, OH (US); Mark Smale, Hudson, OH (US); Michael W. Hayes, Canton, OH (US); Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 275 days.

(21) Appl. No.: 13/142,510

(22) PCT Filed: Dec. 28, 2009

(86) PCT No.: PCT/US2009/069584
§ 371 (c)(1),
(2), (4) Date: Jan. 19, 2012

(87) PCT Pub. No.: WO2010/078248
PCT Pub. Date: Jul. 8, 2010

(65) Prior Publication Data
US 2012/0108736 A1 May 3, 2012

Related U.S. Application Data

(60) Provisional application No. 61/141,794, filed on Dec. 31, 2008.

(51) Int. Cl.
*C08L 9/00* (2006.01)
*C08F 136/00* (2006.01)
*C08L 9/06* (2006.01)

(52) U.S. Cl.
CPC ... *C08L 9/00* (2013.01); *C08L 9/06* (2013.01); *C08L 2205/02* (2013.01)

(58) Field of Classification Search
CPC ... C08L 9/00; C08L 2666/06; C08L 2666/08; C08L 136/06
USPC ...................................................... 524/571
See application file for complete search history.

(56) References Cited

U.S. PATENT DOCUMENTS

| | | | |
|---|---|---|---|
| 3,189,592 A | 6/1965 | Dagley et al. | |
| 3,278,644 A | 10/1966 | Zelinski | |
| 4,471,093 A | 9/1984 | Furukawa et al. | |
| 4,537,936 A | 8/1985 | Takao et al. | |
| 4,575,534 A | 3/1986 | Oshima et al. | |
| 4,894,420 A | 1/1990 | Scriver | |
| 5,153,255 A | 10/1992 | Kondo et al. | |
| 5,177,153 A | 1/1993 | Liebermann et al. | |
| 5,194,485 A | 3/1993 | Kikuchi et al. | |
| 5,202,387 A | 4/1993 | Halasa et al. | |
| 5,508,336 A * | 4/1996 | Takeichi et al. | 524/496 |
| 5,717,029 A | 2/1998 | Bonekamp et al. | |
| 5,901,766 A | 5/1999 | Sandstrom et al. | |
| 5,959,039 A | 9/1999 | Yokoyama et al. | |
| 6,027,800 A | 2/2000 | Sheu | |
| 6,114,451 A | 9/2000 | Shoda et al. | |
| 6,133,376 A | 10/2000 | Hsieh et al. | |
| 6,136,899 A | 10/2000 | Lewandowski et al. | |
| 6,166,140 A | 12/2000 | Sandstrom et al. | |
| 6,191,226 B1 | 2/2001 | Matsuda et al. | |
| 6,232,404 B1 | 5/2001 | Sandstrom et al. | |
| 6,437,205 B1 | 8/2002 | Miller et al. | |
| 6,455,655 B1 | 9/2002 | Colvin et al. | |
| 6,458,884 B1 | 10/2002 | Colvin et al. | |
| 6,469,101 B2 | 10/2002 | Nahmias et al. | |
| 6,469,104 B1 | 10/2002 | Colvin et al. | |
| 6,486,258 B1 | 11/2002 | Noguchi et al. | |
| 6,812,288 B2 | 11/2004 | Kobayashi et al. | |
| 6,984,706 B2 | 1/2006 | Karato et al. | |
| 7,096,903 B2 | 8/2006 | Weydert et al. | |
| 7,189,792 B2 | 3/2007 | Halasa et al. | |
| 7,253,235 B2 | 8/2007 | Nishioka et al. | |
| 7,288,602 B2 | 10/2007 | Thielen et al. | |
| 7,294,680 B2 | 11/2007 | Sone et al. | |
| 7,304,109 B2 | 12/2007 | Nishioka et al. | |
| 7,329,704 B2 | 2/2008 | Labauze | |
| 7,431,061 B2 | 10/2008 | Mathieu et al. | |
| 2004/0054065 A1 * | 3/2004 | Zanzig et al. | 524/525 |
| 2008/0033089 A1 * | 2/2008 | Ellul et al. | 524/322 |
| 2008/0033107 A1 | 2/2008 | Wouters et al. | |

FOREIGN PATENT DOCUMENTS

| | | |
|---|---|---|
| EP | 1 253 170 B1 | 6/2007 |
| JP | 0072823 A | 3/2000 |
| WO | 03102041 A1 | 12/2003 |

OTHER PUBLICATIONS

International Preliminary Report on Patentability for International Appl. No. PCT/US09/69584, dated Jul. 5, 2011; 5 pages.
International Search Report for International Appl. No. PCT/US09/69584, dated Aug. 13, 2010; 3 pages.
European search report dated Aug. 8, 2012 for related application No. PCT/US2009/069584, 5 pages.

* cited by examiner

*Primary Examiner* — Michael A Salvitti
(74) *Attorney, Agent, or Firm* — Meredith E. Hooker; Arthur M. Reginelli

(57) ABSTRACT

A vulcanizable composition of matter comprising a rubber component, a filler, a curative for the rubber, where the rubber component includes a multi-modal polymer including at least two distinct peak molecular weights within a range defined by a lower limit of 80 kg/mole and an upper limit of 500 kg/mole.

2 Claims, No Drawings

US 9,303,154 B2

RUBBER COMPOSITIONS INCLUDING A POLYMERIC COMPONENT HAVING A MULTI-MODAL MOLECULAR WEIGHT DISTRIBUTION

This application claims the benefit of U.S. Ser. No. 61/141,794, filed on Dec. 31, 2008, which is incorporated herein by reference.

FIELD OF THE INVENTION

Embodiments of the present invention relate to vulcanizable compositions that include a multi-modal polymeric component and the use of these vulcanizable compositions in the manufacture of tire components.

BACKGROUND OF THE INVENTION

Conventionally, polymers employed in tire components include diene rubbers such as natural rubber (NR), polybutadiene (BR), polyisoprene (IR), and styrene-butadiene copolymer rubber. The traction, tread wear, and rolling resistance of a tire is to some extent dependent upon the dynamic viscoelastic properties of the polymers utilized in making the tire tread. However, optimizing the formulation to improve one of these properties frequently leads to a decline in the other properties. For example, skid resistance and traction characteristics may be improved while sacrificing tread wear or rolling resistance. Thus, a blend of polymers is often employed in order to balance the desired properties of the tire tread.

For example, U.S. Pat. No. 6,437,205 teaches a blend of low molecular weight high-cis polybutadiene and high molecular weight high-cis polybutadiene for use in pneumatic tire treads. The low molecular weight fraction has a number average molecular weight of from about 2 to about 50 kg/mol. The high molecular weight fraction has a number average molecular weight of from about 90 to about 300 kg/mol. The tread exhibits improved fracture properties, snow traction, weight traction, and rolling resistance.

Polymer compositions typically include a plurality of polymer molecules characterized by a variety of sizes or chain lengths. In other words, polymeric compositions typically include a plurality of polymeric molecules that have a variety of molecular weights. The degree of molecular weight differentiation within a polymeric composition can be analyzed and is often referred to as polydispersity. Polydispersity can result from the nature of the catalyst and the polymerization conditions employed in the synthesis of the polymer.

Polymer size or molecular weight is conventionally determined by using Gel Permeation Chromotagraphy with a set of standards, which for example can be supplied by a set of polystyrene standards. This analysis provides a molecular weight distribution that can be represented in the form of a histogram or a continuous curve. In general, the x-axis of the distribution curve may be some direct or indirect measure of the degree of polymerization of the polymer being analyzed, which may be molecular weight, chain length, radius of gyration, intrinsic viscosity or any other property related to molar mass. In general, the y-axis of the distribution curve may be any direct or indirect measure of the amount or concentration of polymer present, which may be the number or weight of polymer molecules, refractive index, turbidity, and the like. The distribution curve may be expressed in many different forms depending upon the functions that are plotted.

It is often useful to characterize a polymer composition using an average size or molecular weight. It is also useful to quantify the distribution around this average value. For example, polymer compositions are often characterized by a weight average molecular weight (Mw) and a number average molecular weight (Mn). The polydispersity may be represented by the Mw/Mn determinations. When a polymer is monodisperse, i.e., where each molecule has the same length or molecular weight, the Mw and Mn are the same, and therefore the Mw/Mn of the polymer is one, and the peak of the curve (Mp) will be same molecular weight as the weight average (Mw) and number average (Mn) molecular weights of the polymer. As those skilled in the art appreciate, monodisperse polymers are generally a theoretical consideration and attempts to make them have thus far required very special circumstances.

Analysis can also be made of the modality of the distribution curve. Monomodal polymers are characterized by one peak in the molecular weight distribution curve. Where the Mw/Mn is greater than one, the peak will typically exist between the weight average (Mw) and number average (Mn) molecular weights of the polymer. It also therefore mathematically follows that the weight average molecular weight (Mw) will be greater than the number average molecular weight (Mn).

Determination of the peak molecular weight (Mp) can be mathematically determined. As is mathematically known, the peak on a curve is where the slope of the curve equals zero; i.e. the location on the curve that has neither a positive or negative slope. In the case of a monomodal distribution, the Mp corresponds to a point on the curve where the slope of the curve changes from positive to negative or vice versa.

In view of this, the first derivative of the molecular weight distribution curve will have a value of zero at the Mp point of the distribution curve. For example, the peak may be defined by the expression $$dW/dM=0$$

where W is the weight of a polymer and M is the molecular mass or weight.

Monomodal polymers will have a zero at one point while multi-modal polymers will have two or more points in their distribution where the first derivative is zero. For example, a bimodal polymer can have three points in its distribution where the first derivative is zero, which points correspond to the two Mp peaks and the third corresponding to the valley between the peaks. Or, bimodal polymers that do not include a valley between the Mp peaks (which may occur in the case of a first peak having a shoulder), then the curve will include two points where the first derivative is zero, the first point corresponding to the Mp of the first peak and the second corresponding to the Mp of the shoulder.

SUMMARY OF THE INVENTION

One or more embodiments of the present invention provide a vulcanizable composition of matter comprising a rubber component, a filler, a curative for the rubber, where the rubber component includes a multi-modal polymer including at least two distinct peak molecular weights within a range defined by a lower limit of 80 kg/mole and an upper limit of 500 kg/mole.

One or more embodiments of the present invention provide a vulcanizable composition of matter comprising: a rubber component, a filler, a curative for the rubber, where the rubber component includes a multi-modal whose gel permeation chromatography (GPC) curve prepared using polystyrene standards has a first derivative of 0 in at least two distinct locations when the curve is integrated over 94% of the polymer molecular weight between the bottom 3% and top 3% of the curve.

One or more embodiments of the present invention provide a vulcanizable composition of matter comprising a rubber component, a filler, a curative for the rubber, where the rubber component is prepared by combining first and second polymers, where the first polymer has a peak molecular weight identified by Mp1, a weight average molecular weight identified by Mw1, and a number average molecular weight identified by Mn1, where the second polymer has a peak molecular weight identified by Mp2, a weight average molecular weight identified by Mw2, and a number average molecular weight identified by Mn2, where 500 kg/mole>Mp1>80 Kg/mole, where 500 kg/mole>Mp2>80 Kg/mole, where Mp1>Mp2, where Mp1>Mw2, and where Mn1>Mp2.

One or more embodiments of the present invention provide a polymeric composition comprising a multi-modal polymer including at least two distinct peak molecular weights within a range defined by a lower limit of 80 kg/mol and an upper limit of 500 kg/mol.

One or more embodiments of the present invention provide a method for preparing a multi-modal polymeric composition, the method comprising providing a first polymer solution including polymer and solvent, where the polymer in the first solution has a peak molecular weight identified by Mp1, a weight average molecular weight identified by Mw1, and a number average molecular weight identified by Mn1 and providing a second polymer solution including polymer and solvent, where the polymer in the second solution has a peak molecular weight identified by Mp2, a weight average molecular weight identified by Mw2, and a number average molecular weight identified by Mn2, where 500 kg/mole>Mp1>80 kg/mole, where 500 kg/mole>Mp2>80 kg/mole, where Mp1>Mp2, where Mp1>Mw2, and where Mn1>Mp2 introducing the first polymer solution with the second polymer solution to form a polymer blend in solvent and isolating the polymer blend from the solvent.

One or more embodiments of the present invention provide a method for preparing a multi-modal polymeric composition, the method comprising providing a first polymer solution including polymer and solvent, where the polymer in the first solution has a peak molecular weight identified by Mp1, a weight average molecular weight identified by Mw1, and a number average molecular weight identified by Mn1 providing a second polymer solution including polymer and solvent, where the polymer in the second solution has a peak molecular weight identified by Mp2, a weight average molecular weight identified by Mw2, and a number average molecular weight identified by Mn2, where 500 kg/mole>Mp1>80 kg/mole, where 500 kg/mole>Mp2>80 kg/mole, where Mp1>Mp2, where Mp1>Mw2, and where Mn1>Mp2 introducing the first polymer solution with the second polymer solution to form a polymer blend in solvent and isolating the polymer blend from the solvent.

DETAILED DESCRIPTION OF ILLUSTRATIVE EMBODIMENTS

The vulcanizable compositions of one or more embodiments of the present invention include a polymeric component, a filler, and a curative. In one or more embodiments, at least a portion of the polymeric component includes a multi-modal polymer. In other embodiments, polymeric component or subcomponent is prepared by introducing at least two polymers that are each characterized by distinct Mp within a particular range and the Mp of each polymer is outside the Mw—Mn range of the other polymer. The vulcanizable compositions may advantageously be employed in the manufacture of tire components.

For purposes of this specification, reference to polymer or polymeric compositions (which terms may be used interchangeably) refers to a plurality of polymeric molecules that are substantially chemically similar or chemically indistinct, except for size or molecular weight. In other words, the polymer molecules are compositionally similar (i.e. same atoms) and structurally similar (i.e. same arrangement of atoms). On the other hand, where at least two chemically distinct polymers are present, which refers to polymers that are compositionally distinct (i.e. distinct atoms) or are structurally or microstructurally distinct (i.e. have different arrangement of similar atoms), reference is made to at least two polymers or two polymeric compositions. Thus, the rubber component of the present invention may include one polymer (i.e. plurality of chemically similar polymeric molecules) or it may include two or more polymers (i.e. two separate pluralities of chemically distinct polymeric molecules). Each distinct polymer of the rubber component of the vulcanizable compositions of this invention may be referred to as a rubber subcomponent; i.e., each chemically distinct polymer is a subcomponent of the larger rubber component of the vulcanizable composition.

In one or more embodiments, the rubber component of the vulcanizable compositions includes a multi-modal polymer. In one or more embodiments, a multi-modal polymer refers to a polymer that is characterized by including at least two distinct peak molecular weights; i.e. two or more Mp, within a range defined by a lower limit of 80 kg/mole, 85 kg/mole, 90 kg/mole, or 100 kg/mole, and an upper limit of 500 kg/mole, 450 kg/mole, 400 kg/mole, or 350 kg/mole, or in the range from about 80 kg/mole to about 500 kg/mole, 90 kg/mole to about 450 kg/mole, or 100 kg/mole to about 400 kg/mole.

In one or more embodiments, the peak molecular weight (Mp) identifies a location on a curve prepared by Gel Permeation Chromatography (GPC) performed on the polymer in question using polystyrene standards where the first derivative, which may be defined by the expression:

$$dW/dM=0$$

where W is the weight of a polymer and M is the molecular mass or weight, is zero, where the curve is integrated over 94 percent of the polymer's molecular weight between the bottom 3% (i.e. 0-3% is excluded) and the top 3% (i.e. 97-100% is excluded). In one or more embodiments, the data from the GPC may be adjusted for Mark-Houwink constants for the polymer in question.

In one or more embodiments, the multi-modal polymer may be prepared during polymerization of the polymer by employing suitable catalyst systems or a combination of catalysts. The preparation of multi-modal polymers is further described in U.S. Pat. Nos. 3,189,592, 3,278,644, 4,537,936, 5,959,039, and 6,323,282, all of which are hereby incorporated by reference. Those skilled in the art will be able to adapt the catalyst system and polymerization conditions of the processes to achieve the desired multi-modal polymers described in this invention.

In other embodiments, the multi-modal polymeric component of the vulcanizable composition may be prepared by introducing two or more polymers that are chemically similar but have different molecular weights. In one or more embodiments, these polymers may be dissolved in a suitable solvent and blended. In other embodiments, these polymers may be introduced and mixed in the solid state. Those skilled in art will be able to select appropriate polymers that can be introduced to achieve the multi-modal polymers described in this invention.

In certain embodiments, the polymers to be introduced with each other can be selected based on the following method. In one or more embodiments, the polymeric component or subcomponent is prepared by introducing at least two polymers that are chemically similar and that are each characterized by distinct Mp within a particular range and the Mp of each polymer is outside the Mw—Mn range of the other polymer.

In one or more embodiments, the polymers that are introduced with each other are each characterized by an Mp within a range defined by a lower limit of 80 kg/mole, 85 kg/mole, 90 kg/mole, or 100 kg/mole, and an upper limit of 500 kg/mole, 450 kg/mole, 400 kg/mole, or 350 kg/mole, or in the range from about 80 kg/mole to about 500 kg/mole, 90 kg/mole to about 450 kg/mole, or 100 kg/mole to about 400 kg/mole.

As is known by those skilled in the art, the number average molecular weight ($M_n$) of a polymer and the weight average molecular weight (Mw) of a polymer are the same where the polydispersity (Mw/Mn) of the polymer is one. An increase in the polydispersity necessarily results in Mw being greater than Mn. Inasmuch as the polydispersity (Mw/Mn) is typically greater than one, a range can be defined between Mn and Mw for a given polymer, which range may be defined as the Mw—Mn range.

In one or more embodiments, first and second polymers may be blended to form the multi-modal polymer, where the first and second polymers are chemically similar. With respect to the first polymer, Mp1 represents the peak molecular weight of the first polymer, Mw1 represents the weight average molecular weight of the first polymer, and Mn1 represents the number average molecular weight of the first polymer. With respect to the second polymer, Mp2 represents the peak molecular weight of the second polymer, Mw2 represents the weight average molecular weight of the second polymer, and Mn2 represents the number average molecular weight of the second polymer.

In one or more embodiments, the selection of the first and second polymers can be made according to the following parameters. In one or more embodiments, 500 kg/mole>Mp1>80 kg/mole, in other embodiments 450 kg/mole>Mp1>90 kg/mole, in other embodiments 400 kg/mole>Mp1>95 kg/mole, or in other embodiments 350 kg/mole>Mp1>90 kg/mole; and 500 kg/mole>Mp2>80 kg/mole, in other embodiments 450 kg/mole>Mp2>90 kg/mole, in other embodiments 400 kg/mole>Mp2>95 kg/mole, or in other embodiments 350 kg/mole>Mp2>90 kg/mole. In these or other embodiments, Mp1>Mp2. In these or other embodiments, Mp1>Mw2. In these or other embodiments, Mn1>Mp2. In these or other embodiments, 10>Mw1/Mn1>1, and 10>Mw2/Mn2>1; or in other embodiments 8>Mw1/Mn1>1, and 8>Mw2/Mn2; or 6>Mw1/Mn1>1, and 6>Mw2/Mn2; or 4>Mw1/Mn1>1, and 4>Mw2/Mn2.

In one or more embodiments, the amount of the first polymer introduced to the second polymer to obtain the multi-modal polymer may vary to any degree that allows one to achieve the multi-modal polymer defined by this invention. In one or more embodiments, the weight ratio of the first polymer to the second polymer may be from about 20:1 to about 0.05:1, in other embodiments from about 5:1 to about 0.2:1, and in other embodiments from about 2:1 to about 0.5:1.

In one or more embodiments, the multi-modal polymer may be a polydiene or polydiene copolymer, which refers to a polydiene polymer having polymeric units (i.e. mer units) deriving from the copolymerization of non-diene monomer together with the diene. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene, and mixtures thereof. Examples of monomer copolymerizable with diene include vinyl-substituted aromatic compounds such as styrene, p-methylstyrene, α-methylstyrene, and vinylnaphthalene.

Specific examples of polydienes include, but are not limited to, polybutadiene, polyisoprene, poly(styrene-co-butadiene), poly(styrene-co-butadiene-co-isoprene), poly(isoprene-co-styrene), poly(butadiene-co-isoprene), or a combination thereof. Copolymers may include random copolymers and block copolymers. In one or more embodiments, the polymers may include one or more functional groups.

In one or more embodiments, the polydienes (or polydiene portion of a polydiene copolymer) may be high cis-1,4-polydienes having a cis-1,4-linkage content that is greater than 60%, in other embodiments greater than about 75%, in other embodiments greater than about 90%, and in other embodiments greater than about 95%, where the percentages are based upon the number of diene merunits adopting the cis-1,4 linkage versus the total number of diene mer units. Also, these high cis-1,4-polydienes may have a 1,2-linkage content that is less than about 7%, in other embodiments less than 5%, in other embodiments less than 2%, and in other embodiments less than 1%, where the percentages are based upon the number of diene mer units adopting the 1,2-linkage versus the total number of diene mer units. The balance of the diene mer units may adopt the trans-1,4-linkage. The cis-1,4-, 1,2-, and trans-1,4-linkage contents can be determined by infrared spectroscopy.

Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, all of which are hereby incorporated by reference.

In one or more embodiments, the polydienes (or polydiene portion of a polydiene copolymer) may be medium or low cis-1,4-linkage contents. These polymers, which can be prepared by anionic polymerization techniques, can have a cis-1,4-linkage content of from about 10% to 60%, in other embodiments from about 15% to 55%, and in other embodiments from about 20% to about 50%. These polydienes may also have a 1,2-linkage content from about 10% to about 90%, in other embodiments from about 10% to about 60%, in other embodiments from about 15% to about 50%, and in other embodiments from about 20% to about 45%.

Preparation of polydienes having medium or low cis-1,4-linkage contents, for example as obtained from anionic polymerization using an organo-lithium initiator, is described Anionic polymerization is further described in George Odian, Principles of Polymerization, ch. 5 ($3^{rd}$ Ed. 1991), or Panek, 94 J. Am. Chem. Soc., 8768 (1972), which are incorporated herein by reference.

In one or more embodiments, the multi-modal polymer is employed as the rubber component of a vulcanizable composition of matter. The multi-modal polymer may form the entirety or substantial entirety of the rubber component, or it may form only a portion of the rubber component (i.e. it is a subcomponent of the rubber component). Where the multi-modal polymer is a subcomponent of the rubber component, the remainder of the rubber component may be formed from other rubber polymers (i.e., polymers that can be vulcanized to form compositions possessing elastomeric properties).

Other rubbery polymers that may be used include natural and synthetic elastomers. The synthetic elastomers typically derive from the polymerization of conjugated diene monomers. These conjugated diene monomers may be copolymerized with other monomers such as vinyl-substituted aromatic monomers. Other rubbery polymers may derive from the polymerization of ethylene together with one or more α-olefins and optionally one or more diene monomers. Examples of useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

In one or more embodiments, the weight ratio of the multi-modal polymer to the other elastomers that may be present within the rubber component of the vulcanizable compositions may be 1:0, in other embodiments from about 0.05:1 to about 20:1, in other embodiments from about 0.1:1 to about 10:1, in other embodiments from about 0.2:1 to about 5:1, and in other embodiments from about 0.5:1 to about 2:1.

Advantageously, the multi-modal polymer's of this invention are useful in for preparing the rubber component (or a portion thereof) of vulcanizable compositions that are useful in preparing tire components. In one or more embodiments, vulcanizates prepared from these vulcanizable compositions unexpectedly demonstrate improved wear resistance and crack growth resistance.

In one or more embodiments, the vulcanizable compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

In one or more embodiments, the vulcanizable compositions may include a curative or cure package. A multitude of rubber curing agents (also called vulcanizing agents) may be employed, including sulfur or peroxide-based curing systems. Curing agents are described in *Kirk-Othmer, ENCYCLOPEDIA OF CHEMICAL TECHNOLOGY*, Vol. 20, pgs. 365-468, ($3^{rd}$ Ed. 1982), particularly *Vulcanization Agents and Auxiliary Materials*, pgs. 390-402, and A.Y. Coran, *Vulcanization, ENCYCLOPEDIA OF POLYMER SCIENCE AND ENGINEERING*, ($2^{nd}$ Ed. 1989), which are incorporated herein by reference. Vulcanizing agents may be used alone or in combination.

Other ingredients that may be included in the vulcanizable compositions include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. In particular embodiments, the vulcanizable compositions of the present invention are employed in tread and sidewall formulations. In one or more embodiments, these tread formulations may include from about 10% to about 100% by weight, in other embodiments from about 35% to about 90% by weight, and in other embodiments from about 50% to 80% by weight of the multi-modal polymer, based on the total weight of the rubber within the formulation.

In one or more embodiments, the vulcanizable rubber composition may be prepared by forming an initial masterbatch that includes the rubber components and filler (the rubber component including the multi-modal polymer of this invention). When the multi-modal polymer is formed during polymerization, the polymer cement may be supplied directly from the polymerization reactor.

In one or more embodiments, two or more elastomeric polymers having different molecular weights may be dry blended prior to masterbatch mixing. In other embodiments, two or more elastomeric polymers having different molecular weights may be added to the mixer and mixed during formation of the initial masterbatch.

In one or more embodiments, two or more elastomeric polymers having different molecular weights may be wet blended prior to masterbatch mixing. When wet blending is employed, two or more elastomeric polymers having different molecular weights may be dissolved together in a solvent and dried. The dried blend may be added to the mixer as part of the initial masterbatch.

Suitable solvents include aromatic hydrocarbons, aliphatic hydrocarbons, or cycloaliphatic hydrocarbons.

The initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents.

Once the initial masterbatch is processed, the vulcanizing agents may be introduced and blended into the initial masterbatch at low temperatures in a final mixing stage, which preferably does not initiate the vulcanization process. Optionally, additional mixing stages, sometimes called remills, can be employed between the masterbatch mixing stage and the final mixing stage. Various ingredients including polymer can be added during these remills. Rubber compounding techniques and the additives employed therein are generally known as disclosed in *The Compounding and Vulcanization of Rubber*, in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Examples 1-6

The high-cis 1,4-polybutadiene polymers of examples 1-6 were prepared by neodymium (Nd) catalyzed polymerization of butadiene. Molecular weight and microstructure of these polymers are summarized in the following Table 1.

TABLE 1

|  | Mn | Mw | Mw/Mn | cis(%) | trans(%) | Vinyl(%) |
|---|---|---|---|---|---|---|
| Example 1 | 154K | 270K | 1.75 | 98.79 | 0.87 | 0.34 |
| Example 2 | 193K | 348K | 1.80 | 99.07 | 0.64 | 0.30 |
| Example 3 | 160K | 256K | 1.59 | 99.08 | 0.66 | 0.26 |
| Example 4 | 187K | 297K | 1.59 | 99.07 | 0.70 | 0.24 |
| Example 5 | 122K | 170K | 1.39 | 98.89 | 0.90 | 0.21 |
| Example 6 | 263K | 388K | 1.47 | 99.28 | 0.53 | 0.19 |

Examples 7-9

Example 7 was prepared by dissolving an equal amount of Example 1 and Example 2 in an organic solvent. Example 8 was prepared by dissolving equal amounts of Example 3 and Example 4. Example 9 was prepared by dissolving equal amounts of Example 5 and Example 6. Molecular weight and molecular weight distribution of these polymers are summarized in Table 2.

TABLE 2

|  | Mn | Mw | Mw/Mn | Mp | Note |
|---|---|---|---|---|---|
| Example 7 | 175K | 303K | 1.73 | 226 | uni-modal |
| Example 8 | 173K | 254K | 1.47 | 223 | uni-modal |
| Example 9 | 174K | 305K | 1.76 | 170 352 | bi-modal |

Example 10-12

Butadiene rubber compositions that are useful for preparing tire treads were prepared and cured using conventional procedures. The rubber compositions were tested for various properties as shown in Table 3. Examples 10-12 are the same rubber composition, except for the polymer. Example 10 contained the polymer of Example 7. Example 11 contained the polymer from Example 8. Example 12 contained the polymer from Example 9.

TABLE 3

|  | Examples | | |
|---|---|---|---|
|  | 10 | 11 | 12 |
| ML1 + 4 | 88.1 | 81.4 | 90.4 |
| Rebound | 72 | 71.5 | 72.3 |
| LambournWear 25% | 0.0627 | 0.0618 | 0.0582 |
| 65% | 0.0509 | 0.0495 | 0.0456 |
| MicroDumbbell rt | | | |
| M50 | 1.69 | 1.76 | 1.72 |
| M100 | 2.74 | 2.84 | 2.86 |
| M300 | 11.88 | 11.90 | 12.40 |
| Strain to break % | 496 | 484 | 458 |
| Toughness | 49.34 | 46.81 | 42.84 |
| Ring Tensile 50C | | | |
| M50 | 1.6 | 1.66 | 1.68 |
| M100 | 2.41 | 2.52 | 2.58 |
| M300 | 9.00 | 9.29 | 9.62 |
| Strain to break % | 492 | 480 | 463 |
| Toughness | 36.9 | 36.5 | 34.2 |
| Strain Sweep S 50C G'(5%) | 2.76E+06 | 2.95E+06 | 2.89E+06 |
| Tan d (5%) | 0.109 | 0.111 | 0.108 |
| DG'(0%-25%)/G'(0%) | 0.445 | 0.468 | 0.458 |
| TS G'(60)/G(30) | 0.931 | 0.930 | 0.931 |
| dc/dn at 6% (nm/cycle) | 200 | 180 | 90 |
| T(KJ/m2) | 999 | 1019 | 1025 |
| dc/dn at 8% (nm/cycle) | 1000 | 1000 | 810 |
| T(KJ/m2) | 1614 | 1615 | 1667 |

The molecular weight and molecular weight distribution was determined by gel permeation chromatography (GPC) calibrated with polystyrene standards and Mark-Houwink constants for the polymer in question. The cis, trans, and vinyl content was determined by infrared spectroscopic analysis. The Mooney viscosity ($ML_{1+4}$) of the uncured compound was determined at 100° C. by using a Alpha Technologies Mooney viscometer with a large rotor, a one-minute warm-up time, and a four minute running time. The tensile strength at break ($T_b$) and the elongation at break ($E_b$) were determined according to ASTM D412. The Payne effect data ($\Delta G'$) and hysteresis data (tan δ) of the vulcanizates were obtained from a dynamic strain sweep experiment, which was conducted at 50° C. and 10 Hz with strain sweeping from 0% to 25%. $\Delta G'$ is the difference between G' at 0% strain and at 25% strain. Crack growth resistance is evaluated by dc/dn testing at 6% and 8% strain at room temperature.

Various modifications and alterations that do not depart from the scope and spirit of this invention will become apparent to those skilled in the art. This invention is not to be dually limited to the illustrative embodiments set forth herein.

What is claimed is:

1. A vulcanizable composition of matter comprising:
   i. a multi-modal polybutadiene polymer consisting of two distinct peak molecular weights, where both peak molecular weights are within a range defined by a lower limit of 80 kg/mole and an upper limit of 500 kg/mole, where the polybutadiene includes at least 90% of its mer units in the cis-1,4-configuration;
   ii. a filler;
   iii. a curative for the rubber.
2. The composition of claim 1, where the multi-modal polymer consists of two distinct peak molecular weights within a range defined by lower limit of 85 kg/mole and an upper limit of 450 kg/mole.

* * * * *